United States Patent
Smith, II et al.

(10) Patent No.: US 11,349,872 B2
(45) Date of Patent: May 31, 2022

(54) PROVABLY SECURE APPLICATION-SPECIFIC CROSS-DOMAIN SOLUTIONS

(71) Applicant: GENERAL ELECTRIC COMPANY, Schenectady, NY (US)

(72) Inventors: William David Smith, II, Schenectady, NY (US); Krzysztof Kepa, Niskayuna, NY (US); David Safford, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 16/695,797

(22) Filed: Nov. 26, 2019

(65) Prior Publication Data

US 2021/0160285 A1  May 27, 2021

(51) Int. Cl.
*H04L 9/40* (2022.01)
*G06F 21/60* (2013.01)

(52) U.S. Cl.
CPC ............ *H04L 63/18* (2013.01); *G06F 21/602* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 9,088,539 B2 | 7/2015 | Mraz | |
| 9,230,112 B1 | 1/2016 | Peterson et al. | |
| 9,380,023 B2 | 6/2016 | Mraz et al. | |
| 9,596,212 B2 | 3/2017 | Thilenius et al. | |
| 9,967,234 B1* | 5/2018 | Crane | H04L 9/3236 |
| 9,971,910 B2 | 5/2018 | Kling et al. | |
| 2014/0337407 A1* | 11/2014 | Mraz | H04L 43/028 709/203 |
| 2014/0337410 A1* | 11/2014 | Mraz | H04L 63/20 709/203 |
| 2017/0070507 A1* | 3/2017 | Leconte | H04L 63/10 |
| 2018/0241717 A1 | 8/2018 | Bond et al. | |
| 2018/0351914 A1* | 12/2018 | Jobson | H04L 63/105 |
| 2019/0207916 A1 | 7/2019 | Couillard et al. | |
| 2020/0120071 A1* | 4/2020 | Wimmer | H04L 69/165 |
| 2021/0021622 A1* | 1/2021 | Schirck | H04L 41/14 |

FOREIGN PATENT DOCUMENTS

WO  2020107098 A1  6/2020

* cited by examiner

*Primary Examiner* — Brandon Hoffman
(74) *Attorney, Agent, or Firm* — McGarry Bair PC

(57) ABSTRACT

A secure communication path device includes a first secure communication validator providing a one-way communication path from a security domain by implementing a secure protocol parser, a second secure communication validator providing a one-way communication path from a second security domain by implementing a secure second protocol parser. Each validator including respective serial/de-serializer units providing a unidirectional communication path from their respective security domain. The device hardware segregating respective communications of the security domains within the secure communication path device.

17 Claims, 4 Drawing Sheets

PROVABLY SECURE APPLICATION-SPECIFIC CROSS-DOMAIN SOLUTIONS

BACKGROUND

Conventional cross-domain solutions (CDS) move information between different security domains. A CDS can include an integrated system of hardware and software that enables transfer of information among incompatible security domains or levels of classification. A CDS can include solutions for information assurance that provide manual or automatic access, and/or transfer, of information between two or more differing security domains.

An access-type CDS enables user interaction with multiple domains, but strictly isolates each interaction to a single domain at a time and permits no information flow between domains. The user can interact with the multiple domains from a variety of computing platforms and devices including, but not limited to, a single computer, a compound system, a system of systems, and a system-on-chip (e.g., field programmable gate array, application specific integrated circuit, etc.). A multilevel-type CDS also enables user interactions with multiple domains from a single computer, but permits simple information flow between domains as regulated by a mandatory security policy. A transfer-type CDS (sometimes referred to as a "guard CDS") permits information flow between domains as regulated by a more complex mandatory security policy, but it does not enable user interaction to those domains from the same computer that enables the information flow. Instead, user interaction with a domain requires accessing a separate computer designated for that domain.

A guard CDS, which can also be referred to as a guard, may be deployed at the edge of a physical network that defines a security domain. For information to flow from one domain to a different domain, there must be a suitable guard CDS between them. Conventionally, the guard provides the only communication link between those domains.

DESCRIPTION

Embodying systems and methods provide a cross-domain synthesis path that implements secure protocol parsers by incorporating two classes of validators. An embodying Monitoring and Inspection Device (MIND) includes domain-specific validators that serialize data leaving a security domain and deserialize data entering a security domain. The domain-specific validators can interpret application data objects as defined by user groups (i.e., one example of a user group can be Defense Advanced Research Projects Agency (DARPA) Transparent Computing program). The cross-domain validators can provide a high-assurance, one-way information flow coupled with finite state machine-based context tracking of stateful communications between security domains. In accordance with embodiments, the domain-specific and stateful cross-domain validators can be part of building blocks to create pair-wise, cross-domain solutions that can scale to multiple independent security domains. Embodying systems and methods can leverage and extend Language-Theoretic Security (LangSec) tools to a cross-domain synthesis path. This path can implement secure protocol parsers in hardware, software, and/or a combination of hardware/software.

Figure 1:
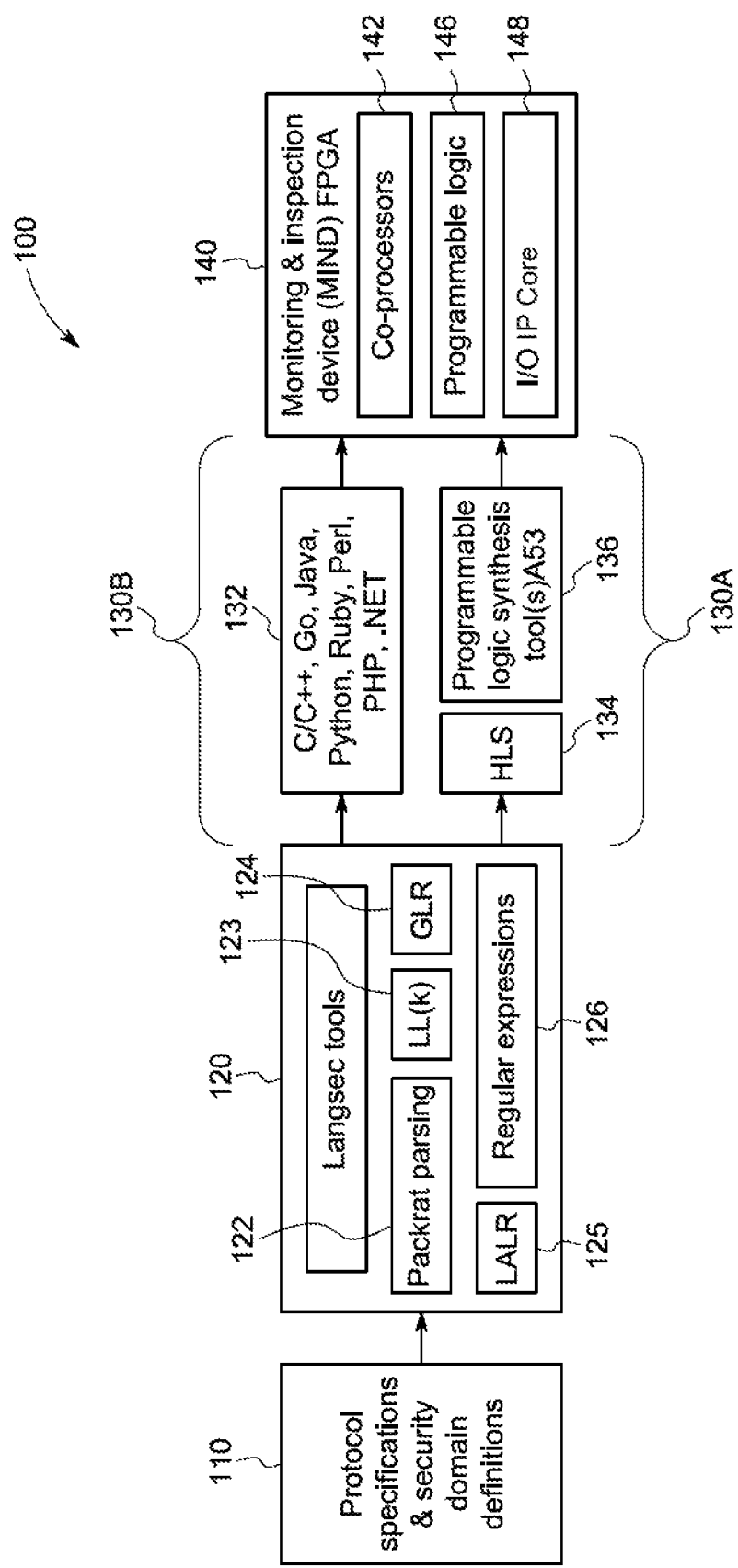
FIG. 1 depicts a device synthesis path incorporating two classes of validators in accordance with embodiments.

FIG. 1 depicts MIND synthesis path 100 in accordance with embodiments. Synthesis path 100 can implement secure communication validators in, for example, a multiprocessor system-on-chip (SoC), a field programmable gate array (FPGA), or an application-specific integrated circuit (ASIC) using logic and run-time board support package (BSP) software. The LangSec tools generate formally-proven, wire-protocol implementations for validating the cross-domain information flows.

In accordance with embodiments, the SoC (or its parts), can be implemented as an application-specific integrated circuit (ASIC). For purposes of discussion, an embodiment implemented as an FPGA will be presented. However, an ASIC or SoC implementation can be developed from this disclosure.

Protocol specifications and security domain definitions 110 are provided to a set of LangSec tools 120. These specifications/definitions define and implement formally-proven secure parsers for the cross-domain validators used in an embodying MIND system. The LangSec tools can be used to implement a variety of high level language programs 132 (including, for example, C/C++ and Go, or other program languages). The programs 132 can include validation software that targets both (either singly or in combination) the application processors (e.g., MicroBlaze soft-core CPUs, RiscV, and/or other soft-core CPU) as well as hardware accelerators in the SoC programmable logic (PL), math engines, GPU cores, etc.

In accordance with embodiments, there can be two or more code paths to the MIND platform. A first code path 130A can use specifications written in digital design language (e.g., C/C++ (transformed into hardware specifications via High Level Synthesis (HLS) tools or HDL (VHDL/Verilog)) code as input to the synthesis tool(s) 136 to generate validator library modules core blocks for the target MIND FPGA 140.

MIND 140 can include co-processors 142 (including but not limited to, a soft-core CPUs (e.g., a MicroBlaze processor), hard IP cores (e.g., ARM A53 or R5 processors), programmable logic 146, and input/output Intellectual Property (IP) core 148).

A second code path 130A can compile secure parser specifications to create runtime software for more complex validation methods that can run on the APU and/or the RPU. These parser specifications can include, but are not limited to: look-ahead left-to-right parser, packrat parser, left-to-right parser, leftmost derivation parser, and/or generalized left-to-right parser.

Figure 2:
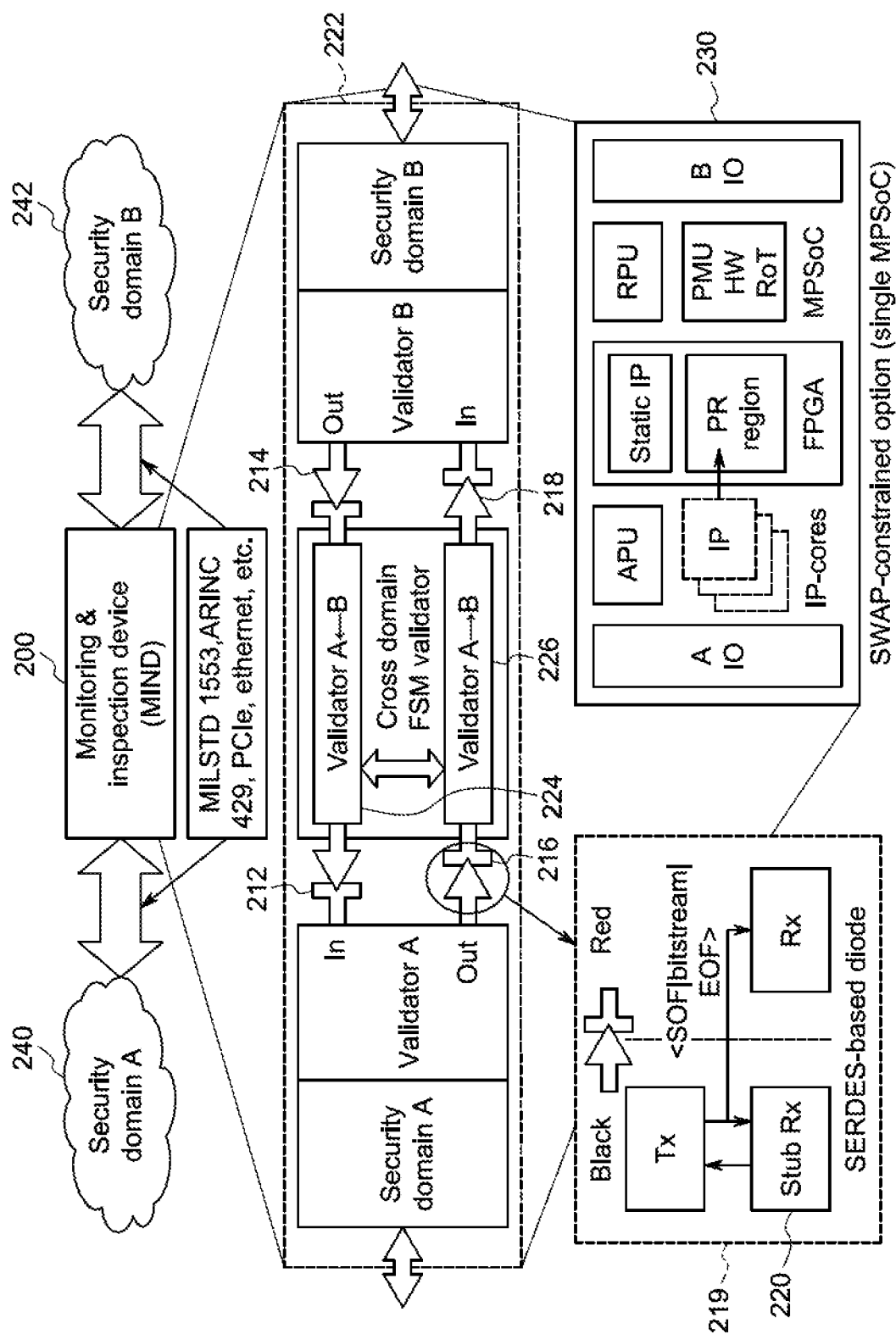
FIG. 2 depicts an architecture for a monitoring and inspection device (MIND) in accordance with embodiments.

FIG. 2 depicts an architecture for MIND 200 in accordance with embodiments. The MIND 200 provides a secure CDS between two protocol-agnostic security domains 240, 242. The security domains are provably segregated in both the hardware programmable logic (PL) and the serializer/de-serializer (SERDES)-based unidirectional (diode) external communication interfaces 212, 214, 216, 218. In accordance with embodiments, each diode interface can include a stub 220 to provide proper termination to an interface. This stub can facilitate link control and management (training, impedance control, etc.) and other functions. The size, weight, and power (SWaP) constrained implementation layer 230 assists the MIND in validating that security domains 240, 242 have hardware independence when the security domains are implemented on a single SoC device.

An embodying MIND can include multiple modules. MIND architecture 200 is based on cross-domain, finite state machine validator MIND Pipeline (MP) 222 built with a set of functionally-independent MIND scalable predefined macro library component modules 224, 226. These hardware IP library modules provide support for a broad mix of scenarios and requirements; such as, but not limited to, system isolation, IO interfaces, functional composability, and performance. An embodying MP can be based on a combination of fundamental primitives (guard/verifier+diode) and other optional primitives dependent on use case:

(1) Driver Interface module: This module mediates data transfers between the isolated security domain and the MP. The default driver interface provides a device abstraction to the operating system/application level. It may optionally provide a shared memory abstraction for cases where this would improve performance.

(2) Transform module: The transform module is configured with a LangSec based parser and transform engine. The engine can be configured as either a verifier that simply enforces content specifications on data (where data that does not parse correctly is dropped), or it can be configured as a guard that transforms data by downgrading or redacting specific fields. In accordance with implementations, the transform module can generate audit events on specified data. For stateful communications, the transform modules use formally-proven finite state machine models to ensure correctness of information flow to and from a security domain. An embodying transform module can include unidirectional state-in and state-out interfaces (FIG. 3; item 301) allowing state synchronization with a return path MP.

(3) Cryptographic module: The cryptographic module performs cryptographic operations, such as encryption and decryption. The details of the cryptographic module implementation can be specified for particular configuration and implementations. In accordance with embodiments, the MIND can provide basic driver hooks for essential functions such as key loading. From these driver hooks, detailed protocols and paradigms can be specified. For example, the cryptographic module can instantiate a very simple write-only character device interface for loading keys from application space. Optionally, MIND can support Xilinx Partial Reconfiguration to provide black-box delivery and instantiation of sensitive crypto engines (e.g., Type 1 crypto) in the run-time. This option can be applied to other MIND block modules.

(4) Diode module: The diode module can enforce unidirectional data flow. The diode module is physically separated from other modules to aid formal verification of isolation and compliance specifications.

(5) Transport Interface module: The transport interface implements the physical link that moves data from one physical system to another. These physical links may be implemented using available I/O interfaces. In some implementations there can be specific transport modules for each interface type, e.g., SERDES, RS232, ethernet, MIL-STD-1553, etc. In accordance with embodiments, a SERDES one-way diode 212, 214, 216, 218 can be schematically represented as item 219. If the media requires bidirectional information flow, the SERDES one-way diode provides isolation and unidirectional flow control. The transport interface would also be used to connect the MP to other MIND hardware in a different security domain when using a distributed MIND system architecture.

In accordance with implementations, a CPU based subsystem can be used in the transport module to implement more complex I/O protocols (e.g., TCP/IP stack, PCIe controller, etc.). In accordance with embodiments, this subsystem can be implemented as a hard core or soft-core CPU. Autonomous "smart" transport interfaces for OS stack offload can be implemented to simplify parsing in the transform module, and to aid formal proofs on guaranteed isolation.

Figure 3:
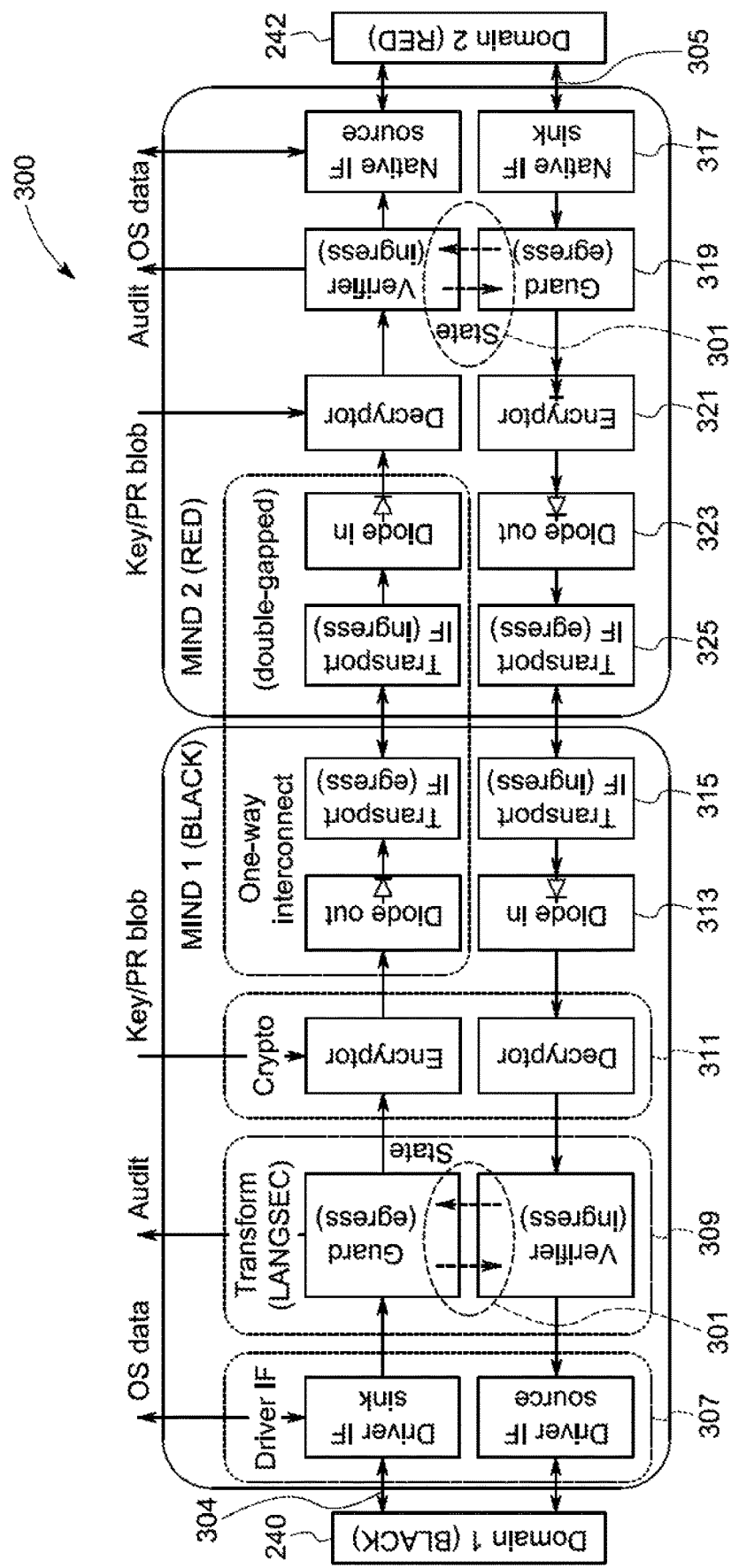
FIG. 3 depicts a MIND pipeline having two security domains in accordance with embodiments.

FIG. 3 depicts a MP cross-domain architecture 300 in accordance with embodiments. FIG. 3 depicts an MP use-case having two security domains 240, 242. However, the invention is not so limited and other numbers of security domains is within the scope of this disclosure.

MP cross-domain architecture 300 components enable stateful, validated and encrypted communication between security domains. The path 304 illustrates sending data from the domain 240 to domain 242; path 305 illustrates a possible return path where data is sent from domain 242 to domain 240.

Application data in domain 240 arrives at a driver interface hardware IP library module 307 on the MIND device. The driver interface is configured to send data to the guard transform hardware IP library module 309 that sanitizes the data. If the data is valid, the guard hardware IP library module then sends the data on to the corresponding crypto hardware IP library module 311, where the data is encrypted.

The cryptographic module then forwards the data through a unidirectional diode hardware IP library module 313 to the cross-domain transport interface 315, which physically sends the validated and encrypted data from the domain 240 to the domain 242.

Similarly, the corresponding transport interface 325 in the domain 242 receives data sent from the domain 240 and forwards this data through a diode hardware IP library module 323 to the crypto hardware IP library module 321 for decryption. The plain text data is then forwarded to the validator transform hardware IP library module 319, which verifies the message content prior to forwarding it to the transport interface hardware IP library module 317. At the transport interface, the message is then sent via the appropriate hardware interface (ethernet, MIL-STD-1553, RS232, etc.) to the domain 242. The return path from the domain 242 to the domain 240 follows the same MP architecture.

In accordance with embodiments, MIND hardware IP library modules can implement the driver, transform (with stateful guard and verification functions), encrypted communication, one-way diode isolation, and transport interface functions between security domains. In some implementations, the return path can vary, and be non-existent in other implementations.

In some implementations, the driver interface module 307, 317 can be optional. When present, the driver interface module can provide a device abstraction to the operating system when the MP is to be managed by a CPU. In accordance with embodiments, the driver interface can send data to, and pull data from, the MP as well as to configure parameters within the MP modules.

The guard and validate transform modules 309, 319 can be generated by the LangSec tools. The transform modules can be structured as formally-proven secure parsers that track and enforce stateful communications between the domains. Implementing formally-proven secure parsers can ensure that any outgoing traffic (path 304) is properly sanitized; and that only valid, and state-conformant, responses are accepted on the optional return path (path 305). It should be readily understood that the outgoing and return path designations are from the perspective of the source security domain. Either of path 304, 305 can be an outgoing and/or return path.

The cryptographic module 311, 321 provides a protocol wrapper for inline cryptographic engines. Dynamic binding (aka "late-binding") can be enabled with specific crypto engines. This dynamic binding can be achieved by combining FPGA partial reconfiguration capabilities with secure boot, and combining the SoC hardware-based root-of-trust with digitally signed and encrypted firmware images. With partial reconfiguration, the crypto engine is only instantiated after validating the boot environment at run-time. In contrast, without partial reconfiguration, sensitive cryptographic and other MIND modules must be integrated at compile time.

The diode module 313, 323 provides the logical and physical separation properties that simplify verification of MP physical isolation assurances. The use of one dual-diode implementations per security domain can eliminate single point of failure in either of the domains, where the dual-diode has an egress and an ingress port.

The transport interface modules 315, 325 are responsible for interfacing with I/O communication protocols (ethernet, RS232, MIL-STD-1553, etc.). These transport interface modules provide media-independent, unidirectional (or bidirectional) links between MIND modules (over fiber, copper, on-chip advanced extensible interface (AXI), etc.). This allows MIND devices to be deployed in a distributed system where MIND domain end-points are not in close physical proximity of each other.

For certain less-sophisticated protocols, the entire driver stack can be implemented as hardware, or on hard-core CPUs (not in PL), or on soft-core CPUs in programmable logic, or a combination thereof. For more complex transport or application logic, the transform module can integrate with a driver module to allow other compute resources on the SoC device (e.g., CPU core(s)) to implement the driver. Allowing configuration of the transport module can potentially allow information to leak. To provably-isolate MP components and prevent information leaks, embodying cross-domain links can use soft-core CPUs and programmable logic combined with the IDF methodology and LangSec.

An embodying modular pipeline architecture can enable scalable IP that can be tailored to specific use cases—e.g., multiple independent security domains on a single MIND device can be supported, a mix of different cryptographic module types, and/or scale data throughput subject to the limitations of the SoC.

An embodying MIND IP component can support multiple use-cases, including (but not limited to) scalable number of security domains as well as complex use-cases such as transparent proxies. For example, with HTTPS traffic where the data is encrypted within a security domain, the encryption can be terminated within the MIND device to perform validation in the MP module in clear text message content. In this implementation, an A53 processor complex can be used in the SoC device to implement an HTTPS proxy server for one domain.

The HTTPS proxy server could terminate the encryption session, and forward the clear text to the MP module in the local programmable logic. The MP module can then send the validated and encrypted traffic to the corresponding SoC device in the other security domain. The second SoC device's MP module can validate and decrypt the information and forward it to the A53 processor complex on the second device. The A53 processor in the second SoC could then run an HTTPS client allowing verified message traffic to proceed to the second security domain.

Figure 4:
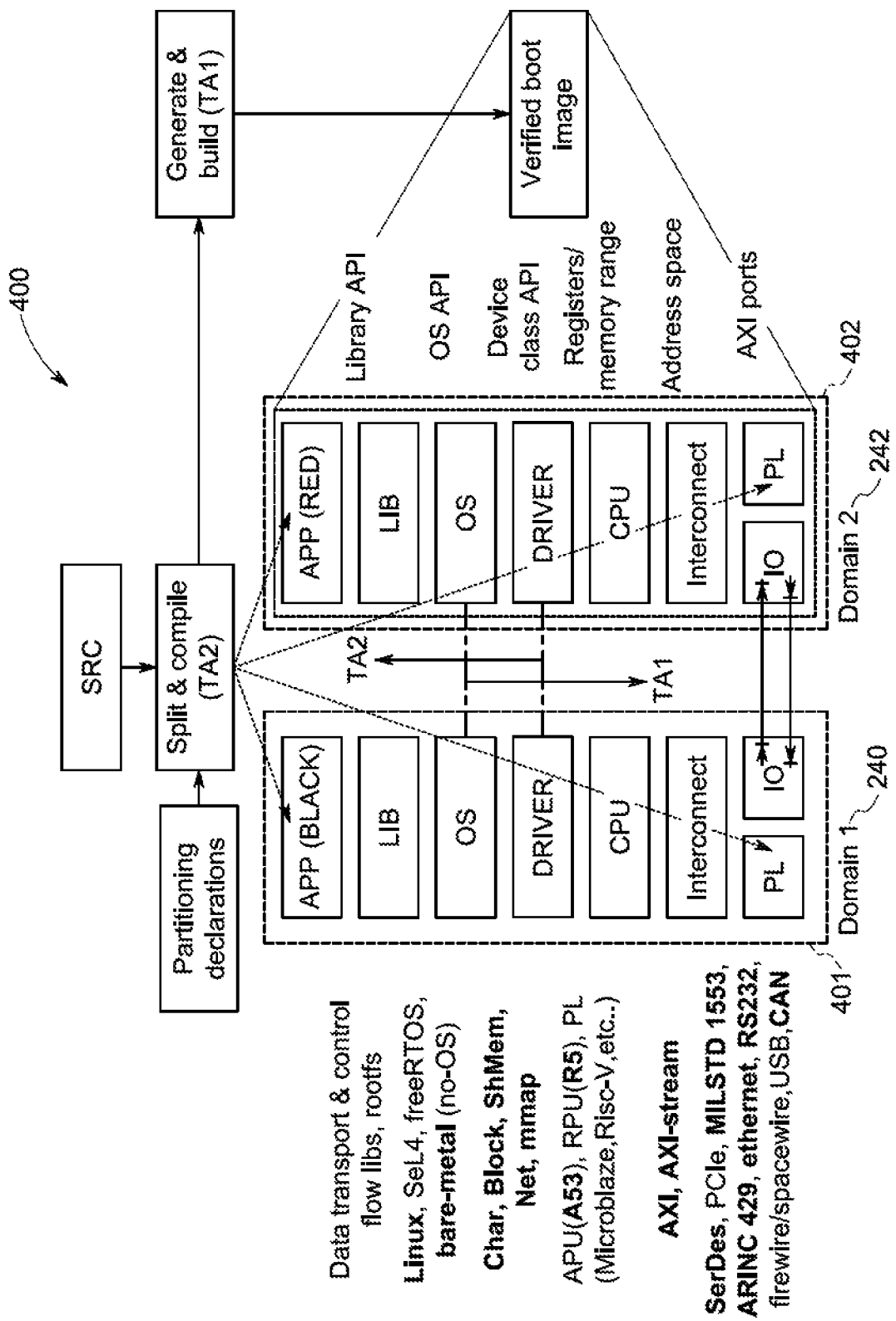
FIG. 4 depicts abstraction layers of a MIND architecture in accordance with embodiments.

FIG. 4 depicts abstraction layers of MIND architecture 400 in accordance with embodiments. A guaranteed architecture for physical security (GAPS) workflow is used to split and compile application artifacts 401, 402 for two security domains 240, 242 and contains a software stack instantiated by the SoC secure boot mechanisms in conjunction with the device hardware root-of-trust (which is physically isolated from the user security domains in run time).

The GAPS workflow also provides the software application and partitioning contract that is implemented and enforced by the MIND hardware IP library module. Split applications 401, 402 can be compiled using transport library elements that provide data and control flow between the domains.

Application artifact 401 can use the transport library and an OS-specific MIND driver to communicate with the MP module implemented in a physically isolated FPGA partition. The MP module enforces the validation contract in hardware and delivers application data and control to its counterpart application artifact 402, which then independently reverifies the validation contract and relays up the stack.

The five types of MIND IP primitive modules disclosed above (i.e., driver Interface module, transform module, cryptographic module, diode module, and transport interface module) can be configured with application information from developers to build a cross-domain validation pipeline. To build the MP, one or more of the following application information is needed:

MP flow specification (providing overall system and module specifications);
LangSec transformation specification;
Crypto specification; and
Connectivity graph, which can be part of the MP flow specification.

The connectivity graph can include where modules are placed in the, for example, FPGA, and how the modules are connected. The exact format of this specification can be determined by performers (e.g., users, developers, etc.). The connectivity graph can be as simple as a list of connections of the format:

<Module ID, Module Type, Source, Destination>

Where Source and Destination may be a specific processor ID, specific hardware interface ID, or another module ID. The MIND tools can check, confirm, and/or verify the flow specification in several ways. In some implementations, each MP module can (optionally) have a driver interface module (which specifies a processor/domain), and a transport interface module (which specifies a hardware interface corresponding to that processor/domain). In a minimal implementation, there is a single flow path between driver and transport modules. A diode module specification can guarantee that the placement of the destination module is isolated, so that there is no information flow in the opposite direction. The LangSec transformation specification can provide the input to the LangSec tools to generate the desired secure parser for filtering, downgrading, redacting, and auditing.

In accordance with embodiments, the flow specification can specify the wire protocol grammar and syntax details acceptable to the LangSec tool. The LangSec tools may accept the grammar and syntax specification from API specification formats such as Data Format Description Language (DFDL) or API management frameworks such as Kong. The LangSec application can include a specification for multiplexing and serializing/deserializing the data sent across the communication paths between security domains. Given the transform code, the MIND tools can generate secure parsing/transform source code to be used within the transform module. An embodying MIND tools can be integrated into API build tools to automatically generate a bootable MIND image. In accordance with implementations, a crypto specification includes the desired cryptographic operation (from a specified list), and any necessary parameters—such as key size, etc.

An embodying MIND device provides a flexible pipeline of provably-isolated MIND hardware IP library modules by leveraging the design flow and optionally the runtime partial reconfiguration capabilities of an FPGA, or the like. These library modules can be combined to support a variety of use cases including, but not limited to, validator, diode and cryptographic functionality.

In accordance with embodiments, MIND device can extend and improve a LangSec's secure parser(s) by augmenting the parsing operation with security level classification, information flow, and cross domain guard support.

The hardware IP library modules contribute to the composable, unidirectional pipeline architecture to support diverse use cases across multiple IO interfaces with various performance and SWaP requirements. Additionally, the MIND device provides cross-domain filtering, redaction, downgrading and audit functionality.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A secure communication path device comprising:
   a first secure communication validator configured to provide a first one-way communication path from a first security domain;
   the first secure communication validator embodied in a programmable logic device and configured to implement a secure first protocol parser;
   a second secure communication validator configured to provide a second one-way communication path from a second security domain;
   the second secure communication validator embodied in the programmable logic device and configured to implement a secure second protocol parser;
   a first serial/de-serializer unit configured to provide a unidirectional communication path from the first security domain;
   a second serial/de-serializer unit configured to provide a unidirectional communication path from the second security domain; and
   respective communications of the first security domain and of the second security domain being segregated by hardware within the secure communication path device;

wherein the first protocol parser and second protocol parser comprise formally proven secure parsers.

2. The device of claim 1, including the first secure communication validator and the second secure communication validator each implementing respective finite state machine-based context tracking of stateful communications.

3. The device of claim 1, including:
   the first one-way communication path transmitting communication from the first security domain to the second security domain; and
   the second one-way communication path transmitting communication from the second security domain to the first security domain.

4. The device of claim 1, the first security domain and the second security domain each being protocol agnostic security domains.

5. The device of claim 1, each of the first secure communication validator and the second secure communication validator accessing respective hardware IP library modules.

6. The device of claim 1, including the secure communication path device being at least partially implemented as logic in a field programmable gate array, an application specific integrated circuit, discrete components, or a combination thereof.

7. The device of claim 1, including:
   a driver interface module configured to mediate data transfers to and from the secure security domain;
   a transform module implementing a secure language based parser and a transform engine, the transform engine configured to at least one of enforce content specifications on data and downgrade specific fields of the data;
   a cryptographic module configured to perform encryption and decryption based on specified protocols and paradigms;
   a diode module configured to enforce unidirectional data flow, the diode module physically separated from other modules using isolation design flow; and
   a transport interface module configured to implement a physical link using an available input/output interface.

8. The device of claim 7, including a soft-core processor unit operating as at least one of the transport interface module, the transform module, and the cryptographic module.

9. The device of claim 7, the transform module including a transform hardware IP library module to sanitize data.

10. The device of claim 7, including the cryptographic module configured to forward encrypted data through one of the first and the second serializer/de-serializer units to the transport interface module.

11. The device of claim 7, including:
    the secure communication path device being a field programmable gate array; and
    the cryptographic module configured to implement dynamic binding by combining partial reconfiguration capabilities of the field programmable array with a secure boot.

12. The device of claim 1, including:
    the first serial/de-serializer unit configured to further provide a unidirectional communication path to the first security domain; and
    the second serial/de-serializer unit configured to further provide a unidirectional communication path to the second security domain.

13. The device of claim 1, at least one of the first protocol parser and the second protocol parser configured to accept a grammar/syntax specification provided in an application program interface specification format, the grammar/syntax specification providing detail on multiplexing and serializing/deserializing data received on a respective first or second one-way communication path.

14. The device of claim 7, the language based parser configured to accept a grammar/syntax specification provided in an application program interface specification format, the grammar/syntax specification providing detail on multiplexing and serializing/deserializing data received from the secure security domain.

15. The device of claim 1, wherein the programmable logic device comprises at least one of a multiprocessor system-on-chip (SoC), a field programmable gate array (FPGA), and an application-specific integrated circuit (ASIC).

16. The device of claim 1, wherein the first protocol parser and second protocol parser are formally proven via Language-Theoretic Security (LangSec) tools.

17. The device of claim 1, where the first protocol parser and second protocol parser are formally proven using Isolation Design Flow (IDF) methodology.

* * * * *